United States Patent
Mitrov et al.

(10) Patent No.: US 8,060,858 B2
(45) Date of Patent: Nov. 15, 2011

(54) INJECTION LIBRARY

(75) Inventors: Vesselin P. Mitrov, Sofia (BG); Vladimir K. Pavlov, Sofia (BG); Hristo K. Sabev, Bourgas (BG)

(73) Assignee: SAP AG, Walldorf (DE)

( * ) Notice: Subject to any disclaimer, the term of this patent is extended or adjusted under 35 U.S.C. 154(b) by 1355 days.

(21) Appl. No.: 11/648,210

(22) Filed: Dec. 29, 2006

(65) Prior Publication Data

US 2008/0163270 A1    Jul. 3, 2008

(51) Int. Cl.
G06F 9/44    (2006.01)

(52) U.S. Cl. .......................................... 717/107

(58) Field of Classification Search .......................... None
See application file for complete search history.

(56) References Cited

U.S. PATENT DOCUMENTS

| | | | |
|---|---|---|---|
| 6,550,060 B1 * | 4/2003 | Hammond | 717/162 |
| 6,779,187 B1 * | 8/2004 | Hammond | 719/331 |
| 6,996,808 B1 * | 2/2006 | Niewiadomski et al. | 717/130 |
| 2003/0191865 A1 * | 10/2003 | De Armas et al. | 709/310 |
| 2005/0108721 A1 * | 5/2005 | Oshima et al. | 719/310 |
| 2005/0160065 A1 * | 7/2005 | Seeman | 707/1 |
| 2007/0198970 A1 * | 8/2007 | Horii et al. | 717/124 |
| 2007/0214461 A1 * | 9/2007 | Glatron et al. | 719/321 |
| 2008/0163270 A1 * | 7/2008 | Mitrov et al. | 719/331 |

OTHER PUBLICATIONS

Dhananjay Nene, "A beginners guide to Dependency Injection" (dated Jul. 1, 2005), retrieved from http://www.theserverside.com/news/1321158/A-beginners-guide-to-Dependency-Injection on Jun. 29, 2010.*
Ryan Lubke, Web Tier to GO with Java EE 5: A look at Resource Injection, retrieved from http://java.sun.com/developer/technicalArticles/J2EE/injection/ on Jun. 29, 2010.*
"Beans, BeanFactory and the ApplicationContext", JAVA/J2EE Application Framework, Dec. 24, 2006. XP002485758, http://web.archive.org/web/20061224230611/http://static.springframework.org/spring/docs/1.2.x/reference/beans.html, 36 pages.
"PCT International Search Report", mailed Jul. 21, 2008. PCT/P2007/010885, 14 pages.
Jendrock, Eric , et al., "The Java EE 5 Tutorial, Third Edition: For Sun Java System Application Server Platform Edition 9", Prentice Hall. XP002486605, (Nov. 3, 2006), 20 pages.

* cited by examiner

*Primary Examiner* — Philip Wang
(74) *Attorney, Agent, or Firm* — Schwegman, Lundberg & Woessner, P.A.

(57) ABSTRACT

A runtime environment injects an instance of an external resource into an application component to be executed in the runtime environment by first determining an external resource associated with the application component, then selecting from a library of injectors an injector to inject an instance of the application component with an instance of an external resource referenced by the external resource annotation. The selected injector determines the instance of the application component to inject with the instance of the external resource and injects the instance of the application component with the instance of the external resource.

14 Claims, 1 Drawing Sheet

INJECTION LIBRARY

FIELD OF INVENTION

The field of invention relates generally to a method and apparatus for a run time environment to inject external resources in to a component class.

BACKGROUND

Java 2 Enterprise Edition ("J2EE") is a specification for building and deploying distributed enterprise applications. J2EE is based on a multi-tiered architecture in which server side program code is divided into several layers including a "presentation" layer and a "business logic" layer.

The presentation layer may be implemented as a Web container and the business layer may be implemented as an Enterprise Java Bean ("EJB") container. Containers are runtime environments which provide standard common services to runtime components. For example, the Java Naming and Directory Interface ("JNDI") is a service that provides application components with methods for performing standard naming and directory services. Containers also provide unified access to enterprise information systems such as relational databases through the Java Database Connectivity ("JDBC") service, and legacy computer systems through the J2EE Connector Architecture ("JCA") service. In addition, containers provide a declarative mechanism for configuring application components at deployment time through the use of deployment descriptors associated with the components or annotations provided in the components (as described in greater detail below).

Each layer of the J2EE architecture includes multiple containers. The Web container, for example, is itself comprised of a servlet container for processing servlets and a Java Server Pages ("JSP") container for processing Java server pages. The EJB container includes three different containers for supporting three different types of enterprise Java beans: session beans, entity beans, and message-driven beans. A more detailed description of J2EE containers and J2EE services can be found in RAGAE GHALY AND KRISHNA KOTHAPALLI, SAMS TEACH YOURSELF EJB IN 21 DAYS (2003) (see, e.g., pages 353-376).

BRIEF DESCRIPTION OF THE DRAWINGS

A better understanding of the present invention can be obtained from the following detailed description in conjunction with the following drawings, in which.

DETAILED DESCRIPTION

Figure 1:
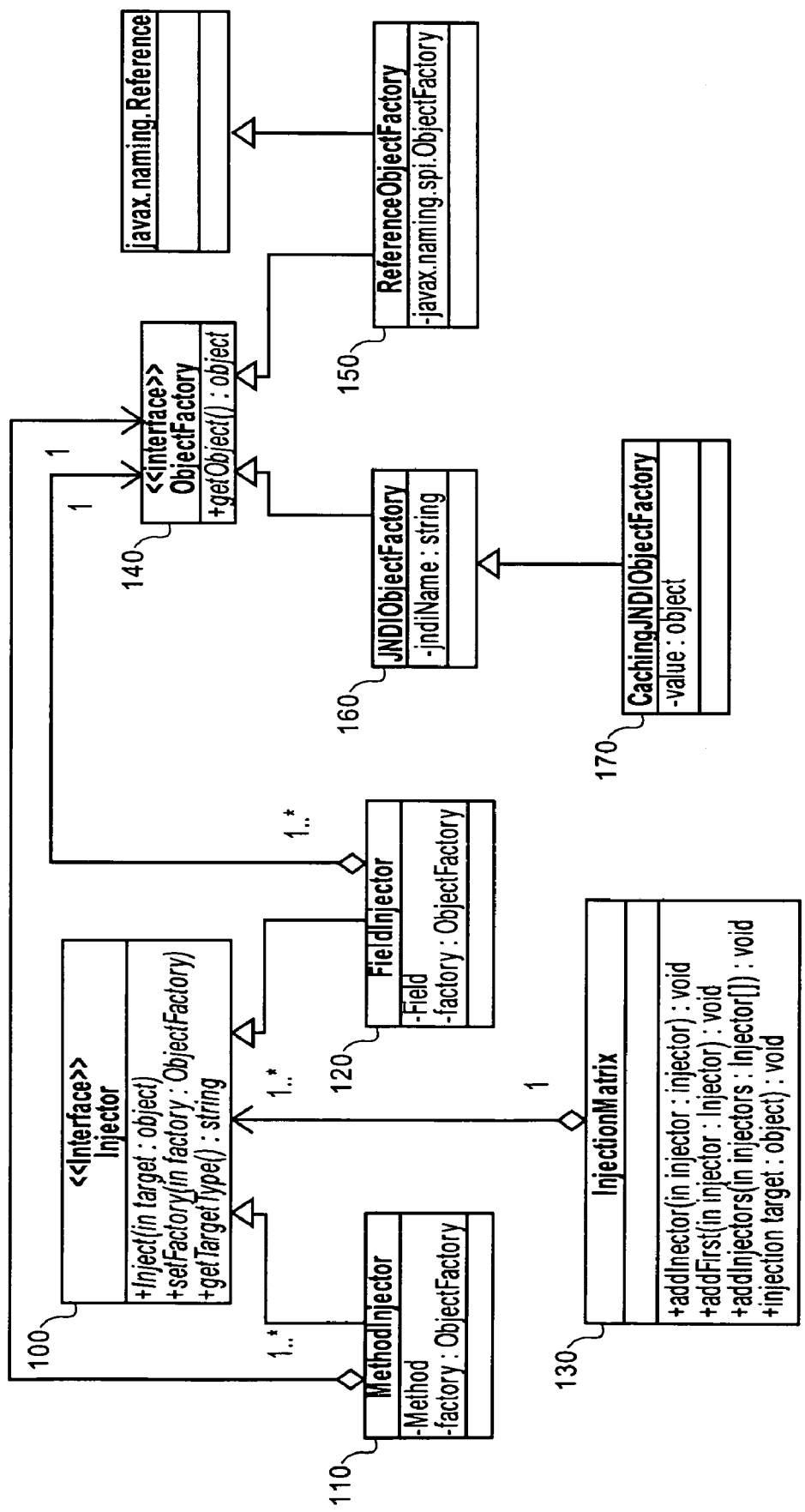
FIG. 1 illustrates a UML diagram of an embodiment of the invention.

In Java™ EE 5 (Java 2 Platform Enterprise Edition Specification, v5.0, published by Sun Microsystems, Inc., Santa Clara, Calif., U.S.A., hereafter "JEE5"), an injection mechanism is introduced for use by application developers. The injection mechanism reduces the need for eXtensible Markup Language (XML) deployment descriptors and makes application development easier. In the case of Enterprise JavaBeans (EJBs), for instance, injection can be used by the enterprise bean provider as an alternative to looking up all the needed external references from an enterprise bean's environment as well as obtaining a reference to its EJBContext. The EJB container takes care of all these operations instead of the bean provider itself, that is, it is the responsibility of the run time provider instead of the application component provider. The EJB Container fills or invokes properly annotated (or, alternatively, specified in the XML deployment descriptor) bean fields or methods just after creating the bean instance. Thus, the bean instance has all the references it needs for use during its lifecycle.

The annotation facility provided in JEE5 allows developers to annotate elements in an application program source file to control the behavior and deployment of the application. Metadata annotations are used to specify expected requirements on container behavior, and to request injection of services and resources, and to specify object/relational mappings. In general, annotations allow an application component developer to communicate the needs of application components to the deployer, including the application component's external resource requirements, security requirements, environment parameters, etc., through class file annotations. Further information about the common JEE5 annotations may be found in JSR 250: Common Annotations for the Java™ Platform™.

Annotations reduce or eliminate the need to deal with J2EE deployment descriptors in many cases. Resource injection augments the existing Java Naming and Directory Interface (JNDI) lookup capability for applications to gain access to external resources available from the operational environment. Resource injection can be combined with deployment descriptors to allow for, at the time of deployment, customization of resource settings specified in the application's source code. A resource annotation is used to declare a reference to a resource. It can be specified on a class, methods or on fields. When the annotation is applied on a field or method, the container will inject an instance of the requested resource into the application when the application is initialized. If the annotation is applied to a class, the annotation declares a resource that the application will look up at runtime. It should be noted that embodiments of the invention may make use of either deployment descriptors or annotations or a combination of both.

Injections can be also performed on interceptor methods. An interceptor may be defined on an enterprise bean class or on an interceptor class associated with the bean. An interceptor class is a class separate from the bean class itself, and can be thought of as a component, e.g., common logic, that wraps around business logic in the bean class. Examples of common logic include logging or tracing components. For more detailed information about the above referenced injection mechanism, refer to the Java Specification Request (JSR) 220: Enterprise JavaBeans™, Version 3.0 EJB Core Contracts and Requirements, published by Sun Microsystems, Santa Clara, Calif., U.S.A., hereafter "EJB 3.0" and JSR 154: Java™ Servlet 2.5 specification, published by Sun Microsystems.

An embodiment of the invention contemplates a design of an injection library and its use by one or more components. In one embodiment, a component may be an EJB service, Web container, application client container, etc., or any other component classes supporting injection. In creating an injection library, the common injection logic is detached into a separate module, thus improving the maintenance of, and facilitating the further development of any other components which need, the injection mechanism.

As earlier noted, injections can be specified either in the XML deployment descriptor or by annotations inside the bean class. Since each component (EJB, Servlet, etc.) has its own metadata object representation, it is not possible to specify a unified application programmatic interface (API) to detect the component injections. For example, a component may use an XML tree structure, while another component may use another representation for metadata. Thus, in one embodiment of the invention, field and method injectors and factories are included in the library and each component should provide its own way to create the injectors and factories. These injectors and factories are described in more detail below.

The injection library specifies the common mechanism to describe and perform the injections. In one embodiment of the invention, basic implementation of the method and field interfaces is included in the injection library. However, in accordance with one embodiment of the invention, the library is extensible and each component can adjust to it according to the component's needs.

The injection library, in accordance with one embodiment of the invention, is depicted in the unified modeling language (UML) diagram provided in FIG. 1. In one embodiment of the invention, the injection library contains the following classes—interface Injector 100, with classes MethodInjector 110 and FieldInjector 120; interface ObjectFactory 140, with classes ReferenceObjectFactory 150, JNDIObjectFactory 160, and CachingJNDIObjectFactory 170; and class InjectionMatrix 130.

ReferenceObjectFactory object 150 is a subclass of interface ObjectFactory 140, which interface obtains instances for a component class that supports injection and uses the library. An "EJBService:EJBContextObjectFactory" object (not shown in FIG. 1) may be a subclass of interface ObjectFactory that is used to obtain instances of EJB Context for a bean being injected, as one example of a component class that supports injection and uses the library. The object would be part of the EJB container, and therefore, not part of the library depicted above. Other component classes would have similar "service specific" object factories that inherit from ObjectFactory, provided by their respective service container, e.g., Web Container.

In one embodiment of the invention, with respect to interface Injector 100, method "setFactory" associates the interface with an interface objectFactory 140. Method "getTargetType" provides the container with the target object field or method type (there can be multiple annotations per class).

InjectionMatrix object 130 provides list of all injectors needed for a given class. Method addFirst promotes an injector to the beginning of the list. Method addInjectors is optional, and allows adding multiple injectors at once to InjectionMatrix, rather than invoking addInjector multiple times.

As noted above, an injection operation can be specified by the application provider either in the class itself by means of an annotation or using the deployment descriptor. Each single injection, which should be executed on a given field or method, is represented in the container by an object of type Injector. Its method inject receives the target of the injection (e.g. bean instance, interceptor class instance, etc) as its argument. In other words, all instances of the same bean share the same injector.

Either a field or a method can be the target of an injection. Thus, in one embodiment of the invention, there are two default implementations of the interface Injector—MethodInjector and FieldInjector. As their names suggest, they differ just by their realization of the actual operation of injecting. In one embodiment of the invention, the Java Reflection API is used to accomplish this. It should be noted that the present invention does not contemplate specifying how to create such Injector objects. Each interested component should provide its own manner to do this.

Once created, the Injector objects can be used during the application lifetime. There is no need to recreate them each time when injection should be performed—the target instance is passed as an argument of the inject method, and the value to be injected is determined by the ObjectFactory.

During creation, or at some later point but before the first injection operation, each Injector receives an ObjectFactory. The Injector uses it each time when injection is being performed in order to get the object, i.e., an instance of a class, to be injected. The ObjectFactory can be thought of as a black box in that it knows how to create and/or obtain the needed objects.

Implementations of ObjectFactory may include the following:

JNDIObjectFactory—for injectors that should lookup the injection value each time. This can be used for injection values which cannot be cached;

CachingJNDIObjectFactory (extends JNDIObjectFactory)—for injectors that can lookup the object to be injected or that can receive it during their creation, and then cache it during the application lifetime;

ReferenceObjectFactory (extends javax.naming.Reference)—for injectors that should receive the injection value each time. However, in contrast to JNDIObjectFactory, this implementation does not perform a lookup from the naming factory. Instead, it directly invokes the proper javax.naming.spi.ObjectFactory. ReferenceObjectFactory extends javax.naming.Reference in order to provide the necessary data to the actual naming factory. It can be used for injection values which cannot be cached and there is no specific ObjectFactory that provides such reference types.

In one embodiment of the invention, in order to provide an easy way to access the injectors and to relieve the library user of the responsibility to choose a data structure in which to keep the injectors (e.g., an array, set, etc.), the InjectionMatrix object 130 may be included in the library. It serves as a facade to access all the injectors added into it. The library user can add all the injectors related to a bean/interceptor/class into it and then just invoke its inject method each time when injection should be performed.

In order to achieve better performance results, separate ObjectFactory implementations can be provided for certain reference types. For example, they can be associated with runtime structures and provide the requested objects faster than if invoking another factory or performing a lookup from the naming factory.

Rather than adding new Injector implementations, each component can implement its own ObjectFactory if needed. However, it is not necessary that the specific ObjectFactory be added into the library. The ObjectFactory could be part of the component which provides and makes use of it.

An embodiment of the invention may be a machine-readable medium having stored thereon instructions which cause a programmable processor to perform operations as described above. In other embodiments, the operations might be performed by specific hardware components that perform the same functions. Those operations might alternatively be performed by any combination of programmed computer components and custom hardware components.

A machine-readable medium may include any mechanism for storing or transmitting information in a form readable by a machine (e.g., a computer), including but not limited to Compact Disc Read-Only Memory (CD-ROM), Read-Only Memory (ROM), Random Access Memory (RAM), and Erasable Programmable Read-Only Memory (EPROM).

The applications of the present invention have been described largely by reference to specific examples and in terms of particular allocations of functionality to certain hardware and/or software components. However, those of skill in the art will recognize that embodiments of the invention can also be produced by software and hardware that distribute the functions of embodiments of this invention differently than herein described. Such variations and implementations are understood to be captured according to the following claims.

What is claimed is:

1. A method for a runtime environment container to inject an instance of an external resource into an application component to be executed in the runtime environment container, the method comprising:
    determining, using one or more processors, the external resource associated with the application component;
    selecting from a library of injectors an injector to inject an instance of the application component with the instance of the external resource referenced by an external resource annotation;
    the selected injector determining the instance of the application component to inject with the instance of the external resource; and
    the selected injector injecting the instance of the application component with the instance of the external resource.

2. The method of claim 1 wherein the application component is selected from a group of application components consisting of an EJB service, a web container, an interceptor class, and an application client container.

3. The method of claim 1, wherein determining an external resource associated with the application component comprises reading an external resource annotation from the application component.

4. The method of claim 1, wherein determining an external resource associated with the application component comprises reading a deployment descriptor associated with the application component from a deployment descriptor file.

5. The method of claim 1, wherein the library of injectors comprises a library of method injectors and field injectors.

6. The method of claim 1 further comprising providing the library with a set of injectors available to the application component.

7. The method of claim 1, wherein the selected injector injecting the instance of the application component with the instance of the external resource comprises the selected injector injecting one of a method element or a field element in the instance of the application component with the instance of the external resource.

8. A non-transitory machine-readable medium having executable code to cause a machine to perform a method for a runtime environment container to inject an instance of an external resource into an application component to be executed in the runtime environment container, the method comprising:
    determining the external resource associated with the application component;
    selecting from a library of injectors an injector to inject an instance of the application component with the instance of the external resource referenced by an external resource annotation;
    the selected injector determining the instance of the application component to inject with the instance of the external resource; and
    the selected injector injecting the instance of the application component with the instance of the external resource.

9. The non-transitory machine-readable medium of claim 8 wherein the application component is selected from a group of application components consisting of an EJB service, a web container, an interceptor class, and an application client container.

10. The non-transitory machine-readable medium of claim 8, wherein determining an external resource associated with the application component comprises reading an external resource annotation from the application component.

11. The non-transitory machine-readable medium of claim 8, wherein determining an external resource associated with the application component comprises reading a deployment descriptor associated with the application component from a deployment descriptor file.

12. The non-transitory machine-readable medium of claim 8, wherein the library of injectors comprises a library of method injectors and field injectors.

13. The non-transitory machine-readable medium of claim 8 further comprising providing the library with a set of injectors available to the application component.

14. The non-transitory machine-readable medium of claim 8, wherein the selected injector injecting the instance of the application component with the instance of the external resource comprises the selected injector injecting one of a method element or a field element in the instance of the application component with the instance of the external resource.

* * * * *